(12) United States Patent
Andrews

(10) Patent No.: US 7,124,118 B2
(45) Date of Patent: Oct. 17, 2006

(54) TRANSIT BEST FARE SYSTEM AND METHOD

(75) Inventor: David W. Andrews, Leesburg, VA (US)

(73) Assignee: Cubic Corporation, San Diego, CA (US)

(*) Notice: Subject to any disclaimer, the term of this patent is extended or adjusted under 35 U.S.C. 154(b) by 0 days.

(21) Appl. No.: 10/081,556

(22) Filed: Feb. 20, 2002

(65) Prior Publication Data

US 2002/0161729 A1    Oct. 31, 2002

Related U.S. Application Data

(60) Provisional application No. 60/316,206, filed on Aug. 31, 2001, provisional application No. 60/277,816, filed on Mar. 21, 2001, provisional application No. 60/270,035, filed on Feb. 20, 2001.

(51) Int. Cl.
G06F 17/00 (2006.01)

(52) U.S. Cl. ........................... 705/417; 235/375

(58) Field of Classification Search .............. 705/1, 705/500, 41, 35, 39, 417, 418, 26, 400, 50; 902/26, 22, 24; 235/380, 382.5, 375, 376, 235/377, 378, 381, 382, 384; 713/172
See application file for complete search history.

(56) References Cited

U.S. PATENT DOCUMENTS

| | | | |
|---|---|---|---|
| 5,612,684 A * | 3/1997 | Kelly et al. .......... 340/870.31 |
| 5,704,046 A | 12/1997 | Hogan | |
| 5,734,722 A | 3/1998 | Halpern | |
| 5,748,737 A | 5/1998 | Daggar | |
| 5,754,654 A * | 5/1998 | Hiroya et al. .......... 380/24 |
| 5,812,070 A | 9/1998 | Tagami | |
| 5,832,090 A * | 11/1998 | Raspotnik .......... 705/66 |
| 5,948,040 A | 9/1999 | DeLorme | |
| 5,953,705 A | 9/1999 | Oneda | |
| 5,969,332 A * | 10/1999 | Ueda et al. .......... 235/492 |
| 5,991,749 A | 11/1999 | Morrill, Jr. | |
| 6,010,074 A * | 1/2000 | Kelly et al. .......... 235/492 |
| 6,070,146 A | 5/2000 | Mimata | |
| 6,085,976 A | 7/2000 | Sehr | |
| 6,402,038 B1 * | 6/2002 | Stanford et al. .......... 235/492 |
| 6,595,416 B1 * | 7/2003 | Newsome et al. .......... 235/381 |

(Continued)

FOREIGN PATENT DOCUMENTS

EP    0 373 036    6/1990

(Continued)

OTHER PUBLICATIONS

"Knowledge Management Proposal; Automated Ticketing Systems: The State of the Art; and Electronic Fare Payment: Basic Concepts", which appears to be published on Jan. 1998, Internet print out.*

Primary Examiner—Igor N. Borissov
(74) Attorney, Agent, or Firm—Townsend and Townsend and Crew

(57) ABSTRACT

A mass transit system of a transit authority automatically determines and applies the lowest possible transit fare to a patron's account, thereby releasing the patron from decisions leading to the most cost effective fare instrument for his or her transit pattern. A fair fare system and method utilizes the transit authority's existing hardware infrastructure, i.e., mainframe, vendors, gates, smart card and Point of Issue (POI) devices, with additional processing mechanisms for determining the best fare over rolling time periods. Because a relatively large storage capacity of the fare instrument is required, smart cards are employed for use with the fare fair system.

21 Claims, 2 Drawing Sheets

U.S. PATENT DOCUMENTS 6,609,114 B1 * 8/2003 Gressel et al. .............. 705/50
6,648,222 B1 * 11/2003 McDonald et al. ......... 235/380
6,736,317 B1 * 5/2004 McDonald et al. ......... 235/384

FOREIGN PATENT DOCUMENTS

| EP | 0 380 377 | 8/1990 |
| EP | 0 596 579 | 5/1994 |
| EP | 0 911 762 | 4/1999 |
| JP | 08087626 | 4/1996 |
| JP | 411250293 A * | 9/1999 |

* cited by examiner

TRANSIT BEST FARE SYSTEM AND METHOD

CROSS-REFERENCES TO RELATED APPLICATIONS

This application is claims priority to U.S. Provisional Application Ser. No. 60/270,035 filed Feb. 20, 2001, and U.S. Provisional Application Ser. No. 60/316,206 filed Aug. 31, 2001 incorporated herein by reference. This application also is related to U.S. Provisional Application Ser. No. 60/277,816 filed Mar. 21, 2001, which is incorporated herein by reference.

BACKGROUND OF THE INVENTION

1. Field of Invention

This invention relates generally to mass transit fares, and more specifically to a transit fare collection system for automatically determining and charging a transit patron the lowest possible fare based upon the transit patron's transit pattern.

2. Background

Transit patrons are presented with a vast number of choices as to the fare instruments that they may purchase for use with mass transit systems including bus, rail, and parking. The optimal financial deal often depends upon the transit patron being able to predict his or her travel patterns and comply with that prediction over a long period of time. In addition, transit fares may vary within a time period due to special rates and promotions. The patron likely is not aware of the special fares to which he or she may have access and/or rights to receive or purchase.

Transit systems of the prior art typically have different fare structuring for each of the modes of transportation. For example, a weekly fare pass for a bus does not apply to rail or parking, or a special rate for parking does not apply for bus travel. Although a patron's pass may be usable for all the mass transit options, the patron does not receive the best possible fare for the combined usage of the mass transit systems. Thus, a need exists for a fare program that allows a transit patron to receive the best fare possible based upon his or her actual travels.

SUMMARY OF THE INVENTION

It is an advantage of the present invention to provide a system for determining a best, or fairest, fare over a rolling time period for a patron utilizing a mass transit system.

It is another advantage to provide a best fare system that may be integrated with an existing mass transit infrastructure without disruption of the infrastructure.

It is yet another advantage to provide a best fare system that provides the option of allowing best fare structuring for one or any combination of the mass transit systems including bus, rail, and parking.

In an exemplary embodiment of the present invention, a mass transit system of a transit authority includes a best fare processing system for automatically determining and applying the lowest possible transit fare to a patron's account. The best fare processor thereby releases a patron from having to determine the most cost effective fare instrument for his or her transit pattern. A best fare system and method of the exemplary embodiment utilizes a smart card as a fare instrument with the transit authority's existing hardware infrastructure, i.e., mainframe, vendors, gates, smart card and Point of Issue (POI) devices. Any type of smart card from which stored value is deducted may be utilized with the best fare system.

In the exemplary embodiment of the invention, the best fare system is accessible by patrons who are currently enrolled in existing transit programs such as SmarTrip® offered by the Washington Metropolitan Area Transit Authority (WMATA). However, in other embodiments, a transit patron may opt to participate in various levels of the best fare program depending upon the patron's access rights, e.g., special fares for disabled, elderly, etc. utilizing a smart card point of issue device or a vending machine.

The best fare system, which is also referred to herein as the fair fare system, operates in real-time at rail transit exit gates, parking lot equipment (PLE), at bus fare boxes, and at other mass transit facilities. In the exemplary embodiment of the present invention, a central computer system includes the best fare processing device for storing and recording price points, downloading the price points to the exit gates, fare boxes and PLE, analyzing the transit patrons' transactions and benefits, and for producing a credit adjustment in a "time late" mode. The "time late" mode refers to an analysis of the best possible fares based upon a time period that may start at any day prior to the patron's present day transaction.

A smart card utilized with the fair fare system of the exemplary embodiment is formatted to support existing data requirements including the purse value, serial numbers, date of purchase, deposit paid, station of entry/exit, time of entry, time of exit, etc. A smart card for use with the best fare system is initialized either at a point of issue (POI) device at the time of issue of the smart card, or automatically at fare collection devices, i.e., gates, parking lot equipment, and fare boxes. This allows patrons with previously issued cards to participate in the best fare program, providing they are eligible, without an enrollment requirement. The best fare system also may be configured to offer a fair fare discount to other stored value smart card types, e.g., for elderly and handicapped patrons, student pass, etc.

In the exemplary embodiment of the fair fare system the rail transit exit gates, parking lot equipment, at bus fare boxes are configured to include localized best fare processing. Each structure, i.e., transit gates, bus fare boxes, and parking lot equipment, receives a list of best fare options from the transit central computer and utilizes the information together with the travel information stored on a patron's smart card to determine whether the patron is entitled to a best fare award. The results of the analysis are sent to the mass transit central computer for storage in a transaction summary database.

The fair fare system and method of the exemplary embodiment of the present invention is based upon "rolling" time periods. A rolling time period varies and includes a past "X" number of days. A smart card that is initialized for the fair fare system performs a function analogous to a check register by recording total fares deducted for each day of the last "X" days. Because the typical transit pass is issued on a weekly, monthly, quarterly, etc., basis, the time period "X" of the exemplary embodiment is a multiple of seven (7) days. A smart card typically has sufficient memory to store twenty-eight travel events. In one embodiment of the invention, the last twenty-eight (28) days, i.e., four weeks, is utilized as a maximum "real time" benefit period. The fare fair system utilizes configurable "price points" which are downloaded to the exit gates, fare boxes and parking lot equipment. These devices are configured to compare the downloaded "price points" to accumulated values contained on the fair fare smart card. An example "price point" is $100/28 days (equivalent to a rail transit 28 day fast pass), or $25/7 days (equivalent to the rail transit 7 weekly fast pass).

In the exemplary embodiment of the invention, the mass transit fare devices, e.g., rail gates, bus fare boxes and parking lot equipment, have their own downloaded "price point" tables to support different tariffs. The tariffs may vary according to the type and/or location of the mass transit fare devices. In other embodiments, the transit authority may choose to offer the same price points to any combination of the gates, fare boxes and parking lot equipment.

The mass transit fare devices of the fair fare system of the exemplary embodiment compare the applicable price points with the amount deducted from the fair fare card during the past "X" days within a price point time period. If the amount deducted is less than a longer period price point threshold, then the system verifies whether another price point is met. If so, the transit patron rides free for the duration of that price point period. When a price point is met and the patron is awarded the best fare, the end of the validity period is calculated based upon the day the patron's accumulated expenditure met the price point working back from "today", i.e., the present day transaction. Each of these period evaluations is a sliding scale, meaning that as a price point drops off the measuring scale, a subsequent price point is picked up which can be extended to the validity period. Typically, a longer price point period is a better bargain than a shorter price point periods. However, the exemplary embodiment verifies whether shorter periods are at special rates and applies the best fare option.

The "rolling" price capability of the exemplary embodiment of the best fare system presents obvious advantages to fixed, arbitrary period passes where the transit patron does not have a choice as to the start date of his or her fare instrument. The inflexibility of the prior art systems is often driven, initially, by the need to print, distribute and sell visual inspection media. The best fare system of the exemplary embodiment is not constrained by these factors, and allows a transit authority to award discounted pass prices to patrons regardless of the circumstances under which the specified price points are realized, i.e., the patrons are rewarded with the discounted fare regardless of their travel patterns.

BRIEF DESCRIPTION OF THE DRAWINGS

The present invention will be better understood from the following detailed description of a preferred embodiment of the invention, taken in conjunction with the accompanying drawings in which like reference numerals refer to like parts and in which.

DESCRIPTION OF THE PREFERRED EMBODIMENT

Figure 3:
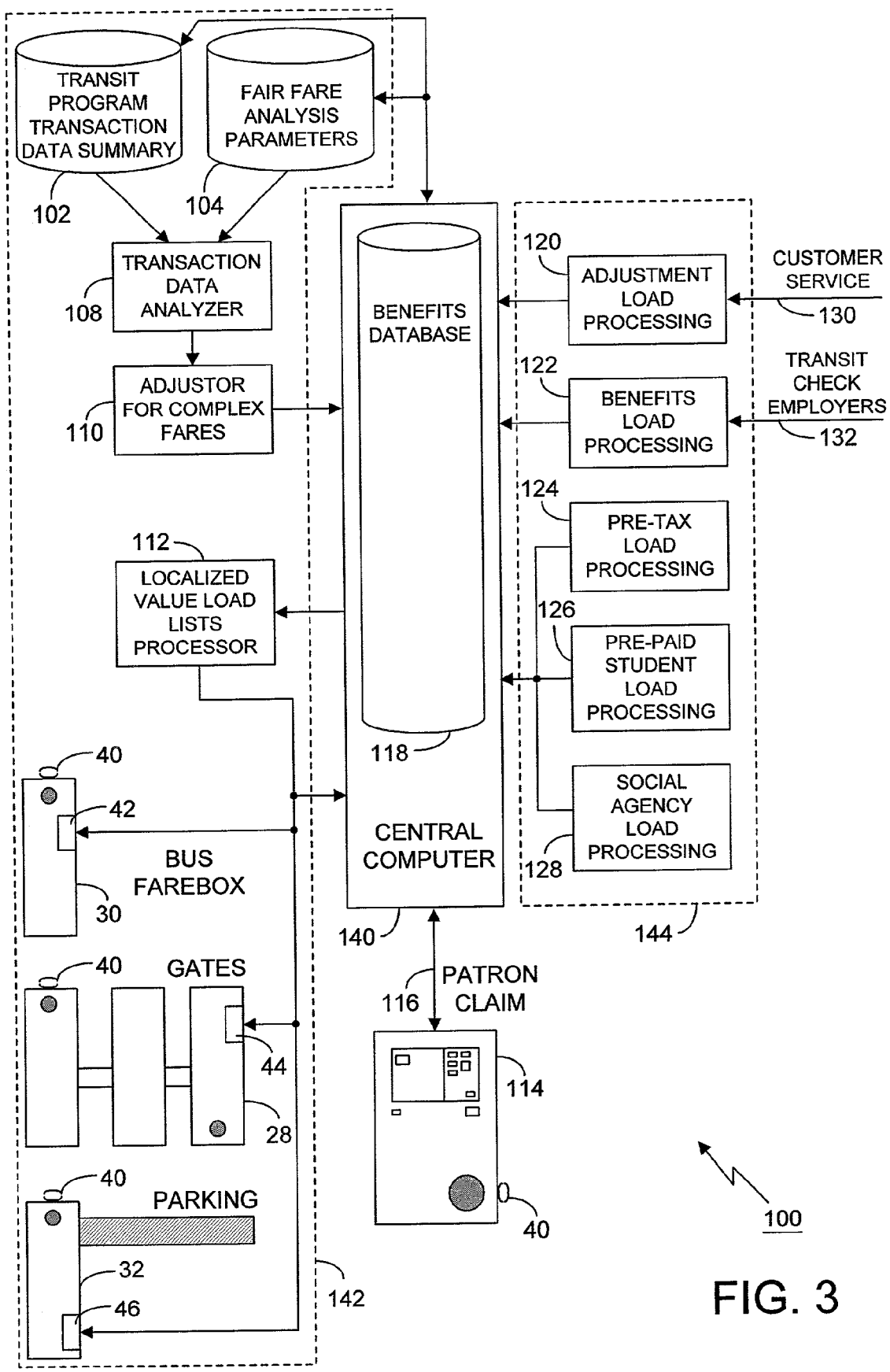
FIG. 3 illustrates the integration of the present invention in a mass transit fare benefits system.

FIG. 3 illustrates a mass transit best fare system 100 of a preferred embodiment of the present invention. The best fare system 100 includes the mass transit central computer 140 having a benefits database 118, optional benefits processing 144, and the best fare processing devices 142 connected to the central computer 140. In the preferred embodiment, the best fare processing devices 108, 110, 112 and data bases 102, 104, and the optional benefits processing 144 are integrated into the central computer 140. The best fare system 100, also referred to herein as the fair fare or fairest fare system, automatically determines and applies the lowest possible transit fare to a patron's account and releases the patron from making decisions as to the most cost effective fare instruments for his or her transit pattern. In a preferred embodiment of the invention, the best fare system 100 is available to patrons who are currently enrolled in existing smart card transit programs, such as SmarTrip® offered by the Washington Metropolitan Area Transit Authority (WMATA). In other embodiments, the vendors 114 and point of issue devices (not shown) provide a patron with the option to participate in various eligibility levels for the best fare system 100.

A fair fare system 100 and method of the present invention is implemented by best fare processing devices 142 including a transit program transaction data summary database 102, a fair fare analysis parameters database 104, a transaction data analyzer 108, an adjustor for complex fares 110, and a localized value load lists processor 112. The existing transit authority mass transit devices, i.e., vendors 114, rail gates 28, bus fare boxes 30, and parking lot equipment 32, are configured to include a best fare processor 42, 44, 46 which stores the current best fair information applicable to the particular mass transit device and which determines whether a patron is eligible to be awarded a best fare each time the patron passes through any of the devices 28, 30, 46.

The fare instrument utilized for implementing the present invention is a smart card which is presented by the patron to the smart card reader/writer 40 located on the mass transit devices 28, 30, 32 and vendors 114. Smart cards provide relatively large storage capacities that are required by the best fare system 100. A typical smart card for use in the fair fare system 100 of the preferred embodiment has a data storage capacity of 1,680 usable bytes, which is equivalent to approximately one half of a printed page. A current program such as SmarTrip® uses approximately 80 bytes, or 5%, of that capacity. The fair fare system together with an auto load system for automatically loading a pre-determined fare value to a card, brings the total required storage capacity to approximately 180 bytes, or about 12% of the capacity of a typical smart card. Thus, ample storage capacity remains on the smart card for further expansion and addition of transit authority programs.

A smart card utilized with the fair fare system 100 must be formatted to support existing data requirements including the purse value, serial numbers, date of purchase, deposit paid, station of entry/exit, time of entry, and time of exit. Thus, before a smart card can record new best fare data, it must be "initialized." Initialization is a one-time operation which may be implement at the time of issue of the smart card at a point of issue (POI) device. However, this option is clearly unrealistic for the tens of thousands of smart cards that are already in circulation in a typical transit system infrastructure such as the WMATA. The preferred embodiment of the present invention may be implemented without an enrollment requirement or option by configuring the fare collection devices, i.e., gates 28, parking lot equipment 32 and fare boxes 30 to automatically initialize all eligible smart cards as they are presented at the readers/writers 40 of these devices.

The best fare system 100 operates in real-time at rail transit exit gates 28, parking lot equipment (PLE) 32 and bus fare boxes 30 when the patron presents a smart card to the smart card readers/writers 40. The access time for a fair fare transaction of the exemplary embodiment is approximately 150 milliseconds at an exit gate 28 or fare box 30 of the mass transit system. Although this transaction time is an increase of the access time for a program such as SmarTrip® which is approximately 90 milliseconds, it remains undetectable for a patron as he or she passes through the mass transit gate.

In the preferred embodiment of the present invention, a best fare system 142 processes the transit patron's transaction and produces a credit adjustment to the smart card stored value in a "time late" mode. That is, the credit adjustment may be made for transit fares already purchased at a vendor 114. In an alternate embodiment, the best fare processing system 142 is limited to controlling how the transit devices 28, 20, 32 implement the fair fare, and recording the event when an enrolled smart card reaches a fair fare threshold as explained below.

The fair fare system 100 of the preferred embodiment of the present invention is based upon "rolling" time periods. Rolling time periods include the past "X" number of days. Typically, the more a patron pays, the greater the transit value obtained. A smart card initialized for use with the fair fare system 100 performs a function analogous to a check register by recording total fares deducted for each day of the last "X" days. In a preferred embodiment, "X" is a multiple of seven (7) days as the typical transit pass is issued on a weekly, monthly, quarterly, etc. basis. In one embodiment of the invention, the last twenty-eight (28) days, i.e., four weeks, is utilized as a maximum "real time" benefit period. The fare fair system 100 utilizes configurable "price points" which are downloaded to the exit gates 28, fare boxes 30 and parking lot equipment 32 by a localized value load lists processor 112. Different price points may be available for each of the transit devices 28, 30, 32. These transit devices 28, 30 32 compare the applicable downloaded "price points" to accumulated values contained on the fair fare smart card. Under a current tariff, for example, the transit authority may download the following "price points" to the exit gates 28:

$100/28 days (equivalent to a rail transit twenty-eight day fast pass), and $25/7 days (equivalent to the rail transit weekly fast pass).

Using the above price point examples, the best fare processor 42, 44, 46 of the transit device 30, 28, 32 initially looks for the $100/28 day price point from the stored transit data on the smart card. For example, if $100 has been deducted from the fair fare card in the past twenty-eight days or less, the transit patron is allowed to ride the transit system free until the twenty-eight days are up. If the amount deducted is less than the $100/28 day price point threshold, then the fair fare system 100 verifies whether the $25/7 day price point is met. If so, the transit patron rides free for the duration of the seven day period. Each of these period evaluations is a sliding scale, meaning that as a price point drops off a measuring scale, a subsequent price point is picked up which may be extended to the validity period. The sliding scale presents the patron with a best fare if the longer period price point is a better bargain than the shorter periods. In an alternate embodiment, for extraordinary circumstances in which shorter periods are at special rates, the transit devices 28, 30, 32 choose the best fare option available which is also downloaded to the fare boxes 30, the gates 28, and the parking gates 32.

In some instances, a transit authority may not want to award a pass utilizing the recursive control provided in the fair fare system price points. The fair fare system 100 thus provides a recursive control function in the fair fare price point table sent to the transit devices 28, 30, 22. When a recursive control is set to "yes" for a given price point, the evaluation of the expenditures cease at the last validity period end date. For example, if a patron is awarded a seven day pass with a validity period that ended two days ago and recursive control "on", then the expenditure evaluation for a seven day price point would cease at the validity period end date of two days ago. The system 100 then evaluates the two days remaining after the validity period for a next price point analysis.

Since longer period passes are typically a better deal for the patron, the recursive control only applies in cases where the evaluated price point is greater than the length of the prior award. As an example, for a twenty-eight day price point in the aforementioned scenario, the evaluation would extend back a full twenty-eight days because the twenty-eight day pass is longer than the previously awarded seven day pass.

When a price point is met and the patron is awarded the pass, the end of the validity period is calculated based upon the day the accumulated expenditure met the price point working back from "today". Table 1 illustrates an example in which a price point is a seven day pass set at $25. The patron is awarded a seven day pass with a start date of ("today"−4) since this is the point at which the price point was met. The patron is then allowed to ride the transit system for "free" for the remaining two days of the seven day period.

TABLE 1

| −7 | −6 | −5 | −4 start | −3 | −2 | −1 | Today | +1 | +2 end |
|---|---|---|---|---|---|---|---|---|---|
| $0 | $0 | $0 | $5.00 | $5.00 | $5.00 | $5.00 | $5.00 | $0 | $0 |

Table 2 illustrates a price point for a seven day pass set at $25. A patron is awarded a seven day pass with a start date of ("today" −5) since ("today −5) is the point at which the price point was met.

TABLE 2

| −7 | −6 | −5 start | −4 | −3 | −2 | −1 | Today | +1 end | +2 |
|---|---|---|---|---|---|---|---|---|---|
| $0 | $0 | $2.00 | $3.00 | $5.00 | $5.00 | $5.00 | $5.00 | $0 | |

The preferred embodiment of the present invention may be applied to any type of smart card from which stored value is deducted. In addition, any "price point" may be configured and downloaded to the transit devices 28, 30, 32. For example, if a new tariff calls for a rail transit pass of $19/5 day, this new "price point" is downloaded by the load lists processor 112 into a new table at the transit gates 28. Fare boxes 30 and parking lot equipment 32 have their own downloaded "price point" tables to support different tariffs. The capability to offer a fair fare discount to other stored value smart card types, e.g., for elderly and handicapped patrons, student pass, etc., is also configurable in the preferred embodiment of this invention.

The "real time" fair fare for quarterly, semi-annual or annual "price points" is not practical due to the number of days which must be evaluated and the storage space provided on a smart card. However, such price points can be supported by storing the patron's transit transaction summary in the best fare system 142 for later evaluation. Any credits and/or adjustments due to the patron can be downloaded to the various processing devices 28, 30, 32, as shown in FIG. 3, to be applied to the patron's smart card the next time the patron passes through one of the devices 29, 30, 32. Adjustments may be based upon quarterly, semi-annual or annual price point discounts. These "after the fact" adjustments permit extension to the high price points of, e.g., one year passes.

In a preferred method for implementing a transit system best fare program, a best fare analysis parameter database 104 stores the price points tables for the various transit system devices 28, 30, 32. This database 104 is updated and maintained by the transit authority through the central computer 140. A transit program transaction data summary database 102 records the patrons transit activities from the transit devices 28, 30, 32 through the connection to the central computer 140. The patron's entitlement to adjustments are analyzed periodically by a transaction data analyzer 108 which identifies whether the patron has met the criteria for a multi-mode, multi-operator or longer term pass. A patron meeting the criteria is awarded an adjustment 110 to the monetary value of their smart cards which is recorded in the benefits database 118, and loaded automatically to the smart cards at the transit gates 28, 30, 32 or at a vendor 114. Although the award is delayed, it does allow a transit authority to achieve a more complex and data intensive fare policy.

The central computer 140 downloads the applicable price point tables to the bus fare boxes 30, the rail gates 28, and the parking lot equipment 32. When a patron passes through a transit device 28, 30, 32 by presenting his or her smart card to the card reader 40, the best fare processor 42, 44, 46 compares the transaction data on the smart card with the price point table values to determine whether a pass should be awarded. The transit device 28, 30, 32 updates the smart card accordingly including any adjustments or credits received from the central computer. The results of the transaction are sent to the central computer 140 for storage in the transit program transaction data summary database 102 and/or the benefits database 118.

The benefits database 118 of the central computer 140 may contain further benefits data. These benefits are maintained and updated by the transit authority 130 or a transit client 132, e.g., a government agency, a company, etc. These benefits include an adjustment load processor 120, a benefits load processor 122, a pre-tax load processor 124, a pre-paid student load processor 126, and a social agency load processor 128 and represent benefits of which a patron may be entitled. These benefits are added to the benefits database 118 and may be credited to the patron's smart card at the transit devices 28, 30, 32.

The preferred method of the present invention further includes a review processor (not shown) for generating adjustments, for producing necessary detail and summary level reports, and for suspending all of the adjustments until they are reviewed and approved by the transit authority staff 130. Upon approval, the adjustments are inserted into the benefits database 118 by the transit authority 130 via an adjustment load processor 120.

The method in which expenditure data is organized on the smart card is a combination of all viable smart card options The preferred embodiment of the best fare system 100 provides configuration options which allow a transit authority to choose how the system 100 operates. Since smart card access time is a limiting factor in implementing the best fare system, a transit central computer 142 is used to offer the transit authority management the ability to configure multiple stacks of twenty-eight day counters on a smart card and specify which stack each device type 28, 30, 32 must use in accumulating dollars spent. This allows the transit authority to support price point structures. For example, a transit authority may configure the system 100 for the following option:

Option 1:
  Bus Price Points
  Rail Price Points
  Parking Price Points

Option 2:
  Bus/Rail Price Points
  Parking Price Points

Option 3:
  Bus/Rail/Parking Price Points.

Figure 1:
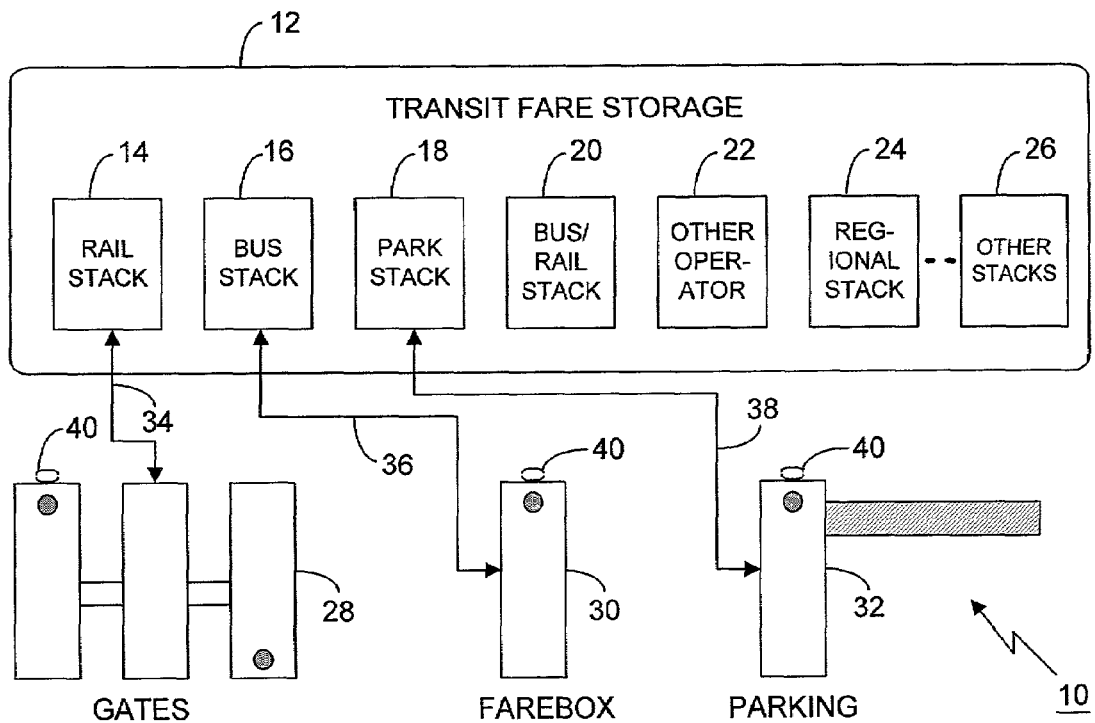
FIG. 1 is a block diagram of a system of the preferred embodiment of the present invention.

FIG. 1 represents Option 1 for bus, rail and parking price points. A transit fare storage 12 device of a transit central computer includes a rail stack 14, a bus stack 16, a park stack 18 that are connected 34, 36, 38 to gates 28, fare boxes 30 and parking 32, respectively. Each stack contains twenty-eight dates of expenditure data for each individual. The rail bus park option 10, provides a stack for each device 28, 30, 32. Further, each device 28, 30, 32 read and writes to its own stack, only. The central computer downloads directives to the devices 28, 30, 32. The directives instruct the devices 28, 30, 32 which stack 14, 16, 18 to use for accumulation and evaluation purposes. The central computer also downloads evaluation criteria to be used by a specific device 28, 30, 32 when evaluating for the purpose of the fair fare system.

Figure 2:
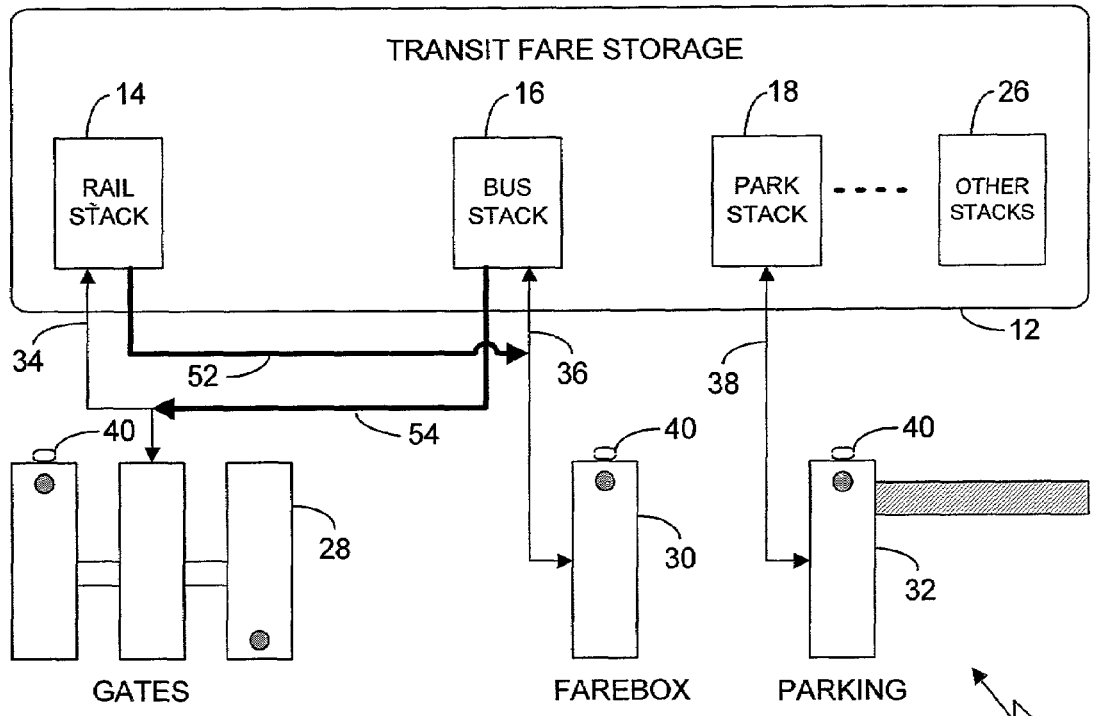
FIG. 2 is a block diagram of a system of an alternate embodiment of the present invention.

In the preferred embodiment, each device 14–26 accesses only one stack, which can be designated by an transit authority operator or by pre-determined modes. This access method minimizes impact on transaction response times. In other embodiments of the present invention, the devices may be configured to read two stacks and write to one stack, as illustrated in FIG. 2. This embodiment is required to support Option 2 price points for combined rail and bus usage 50 in addition to bus only and rail only price points. As illustrated in FIG. 2, the gates 28 may read from the bus stack 16 and the rail stack 14. However, the gates 28 may only write to the rail stack 14. Similarly, the fare boxes 30 may read from both the bus stack 16 and the rail stack 14, but only write to the bus stack 16. The parking device 32 may only read from and write to the park stack 18. The additional read adds an additional 40 milliseconds to the transaction time making it 190 milliseconds in total.

In the preferred embodiment of the present invention, "price points" may be shared between modes. For example, the Weekly Bus/Rail Fast Pass (a Monday to Sunday instrument) may be converted to a rolling "price point" of $30.00/7 days. Once the "price point" is achieved, the same smart card is allowed unlimited travel on both the bus system and the rail system for the specific price point period. Any values deducted on bus would apply to rail, and vice versa. These configuration options allows the transit authority to implement a common price point for multiple modes simply by configuring bus and rail devices to use the same stack of counters and setting new price points in the Fair Fare control table. This is accomplished by pointing both the rail and bus devices to, for example, stack 1. Both types of devices then accumulate stored value use and evaluate the same stack.

Although a preferred embodiment of the invention has been described above by way of example only, it will be understood by those skilled in the field that modifications may be made to the disclosed embodiment without departing from the scope of the invention, which is defined by the appended claims.

I claim:

1. A system for implementing a best fare for each patron of a plurality of patrons, each patron utilizing a smart card for access to a plurality of mass transit devices, the system comprising:
   a mass transit central computer;
   a best fare data base connected to the mass transit central computer, the best fare data base for storing a plurality of price point tables, each price point table of the plurality of price point tables comprising at least one price point having a maximum fare corresponding to a maximum number of days;
   a value load list processor configured to download at least one of the plurality of price point tables to at least one mass transit device of the plurality of mass transit devices; and
   the plurality of mass transit devices coupled to the mass transit central computer and the value load list processor, each mass transit device of the plurality of mass transit devices comprising:
      a smart card reader for reading from and writing to the smart card, the smart card for storing fare transaction data for a plurality of days, the fare transaction data comprising a purchased fare for each day of the plurality of days;
      a best fare processor in communication with the mass transit central computer, the best fare processor configured to analyze a rolling time period comprising a portion of the fare transaction data stored on the smart card against the at least one price point of the each price point table of the plurality of price point tables, the rolling time period having a start date and an end date, the best fare processor configured to determine the best fare for the rolling time period when a sum of the purchased fares for the rolling time period is at least equal to the maximum fare of the at least one price point.

2. The system of claim 1, wherein the plurality of mass transit devices comprises at least one of rail gates, bus fare boxes, and parking lot structures.

3. The system of claim 2, wherein the plurality of price point tables comprises one of at least one bus price point table, at least one rail gate price point table, and a least one parking lot equipment price point table.

4. The system of claim 2, wherein a shared price point table of the plurality of price point tables is shared by at least two of the mass transit devices.

5. The system of claim 1, wherein the start date is determined based upon a first transaction of the fare transaction data stored on the smart card, and the end date is the start date plus the maximum number of days of the at least one price point.

6. The system of claim 5, wherein the maximum number of days is a multiple of seven days.

7. The system of claim 1, wherein the smart card stores the fare transaction data for up to twenty-eight (28) days.

8. The system of claim 1, further comprising:
   a transaction data summary database connected to the mass transit central computer for storing the fare transaction data of the smart card for the each patron;
   a transaction data analyzer connected to the best fare data base and the transaction data summary database, the transaction data analyzer for determining whether the fare transaction data meets requirements for a longer-period price point of at least one longer-period price point table of the plurality of price point tables.

9. The system of claim 8, further comprising an adjustor for determining credits due to the each patron based upon results of the transaction data analyzer and for communicating the credits to the mass transit central computer for download to the smart card of the each patron.

10. A method for determining a best fare for a patron utilizing a smart card for access to at least one mass transit device of a plurality of mass transit devices, the method comprising the steps of:
   storing a plurality of fare transactions on the smart card, each fare transaction of the plurality of fare transactions comprising a purchased fare value;
   downloading at least one price point table to the at least one mass transit device, the at least one price point table having at least one price point comprising a maximum fare and a maximum number of days;
   reading the plurality of fare transactions from the smart card;
   comparing a sum of the purchased fare values for a time period to the at least one price point of the at least one price point table, the time period comprising at least a portion of the plurality of fare transactions defined by a start date and an end date; and
   awarding the patron the best fare when the sum is equal to or greater than the maximum fare of the at least one price point.

11. The method of claim 10, further comprising the steps of:
   storing the plurality of fare transactions from the smart card on a transaction database of a central computer;
   comparing the plurality of fare transactions to a longer-period price point of the at least one price point table; and
   downloading a monetary adjustment to the smart card based upon a result of the comparison.

12. The method of claim 10, wherein the plurality of mass transit devices comprises at least one of rail gates, bus fare boxes, and parking lot structures.

13. The method of claim 12, wherein the at least one price point table comprises one of at least one bus price point table, at least one rail gate price point table, and at least one parking lot equipment price point table.

14. The method of claim 12, wherein a shared price point table of the at least one of price point table is shared by at least two of the mass transit devices.

15. The method of claim 10, wherein the start date is determined based upon a first transaction of the time period, and the end date is the start date plus the maximum number of days of the at least one price point.

16. The method of claim 10, wherein the maximum number of days is a multiple of seven days.

17. The method of claim 10, wherein the smart card stores the plurality of fare transactions for up to twenty-eight (28) days.

18. A system for providing a best fare for a patron utilizing a smart card for access to mass transit devices, the system comprising:
   a mass transit central computer;
   a best fare data base coupled to the mass transit central computer, the best fare data base for storing a plurality of price points, each price point of the plurality of price points comprising a maximum number of days corresponding to a maximum fare;
   the mass transit devices comprising:

a smart card reader for reading from and writing to the smart card, the smart card for storing fare transaction data for a plurality of days; and a best fare processor in communication with the mass transit central computer, the best fare processor for configured to compare the fare transaction data stored on the smart card to the maximum number of days and the maximum fare of the each price point of the plurality of price points to determine the best fare available to the patron for a rolling time period, the rolling time period comprising at least a portion of the plurality of days.

19. The system of claim 18, wherein the rolling time period has a start date and an end date, and wherein the start date for the rolling time period is a first transaction date of the fare transaction data, and the end date for the rolling time period is the start date plus the maximum number of days.

20. The system of claim 18, further comprising:

a transaction data summary database connected to the mass transit central computer for storing the fare transaction data of the smart card for the patron;

a transaction data analyzer connected to the best fare data base and the transaction data summary database, the transaction data analyzer for analyzing whether the fare transaction data meets a longer-period price point of the plurality of price points; and an adjustor for determining credits due to the patron based upon the analysis of the transaction data analyzer.

21. A method for determining a best fare for a patron utilizing a smart card for access to at least one mass transit device of a plurality of mass transit devices, the method comprising the steps of:

storing a plurality of fare transactions on the smart card, each fare transaction of the plurality of fare transactions comprising a purchased fare value;

downloading at least one price point table to the at least one mass transit device, the at least one price point table having at least one price point comprising a maximum fare and a maximum number of days;

reading the plurality of fare transactions from the smart card;

comparing a sum of the purchased fare values for a time period to the at least one price point of the at least one price point table, the time period comprising at least a portion of the plurality of fare transactions defined by a start date and an end date; and awarding the patron the best fare based on the comparison of the sum of the purchase fare values to a price point of the price point table.

* * * * *